May 12, 1953   M. F. BUTTRAM   2,637,910
DOOR HANGING GAUGE
Filed Jan. 25, 1949
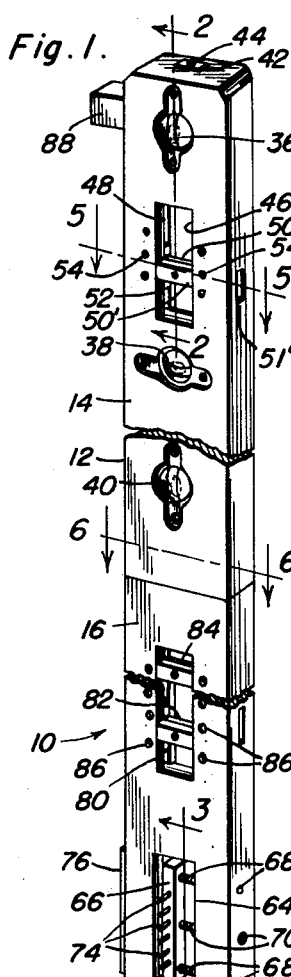
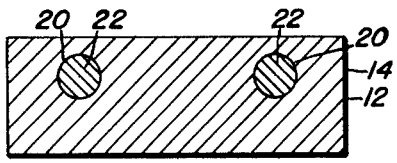
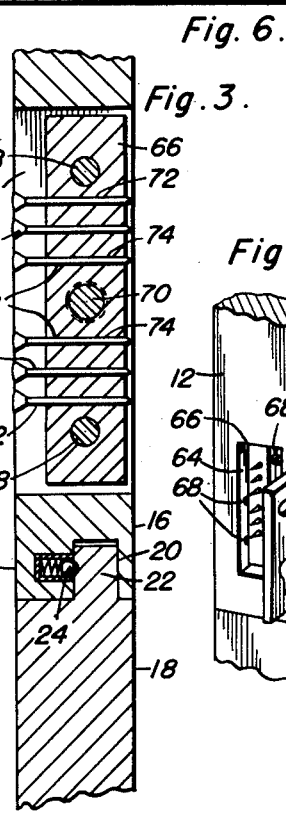
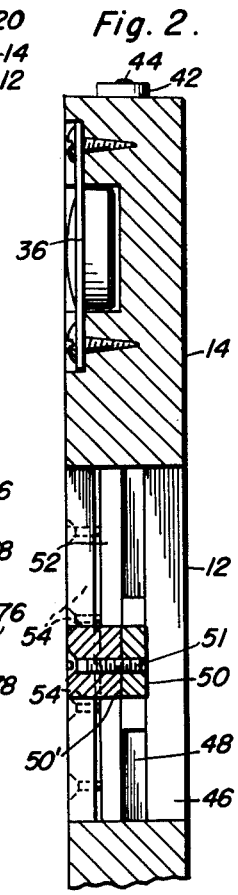
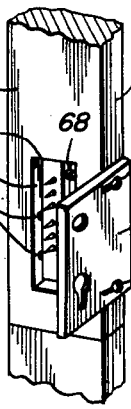
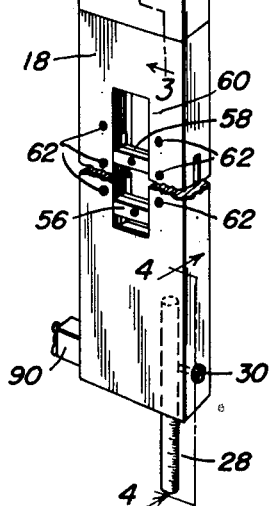
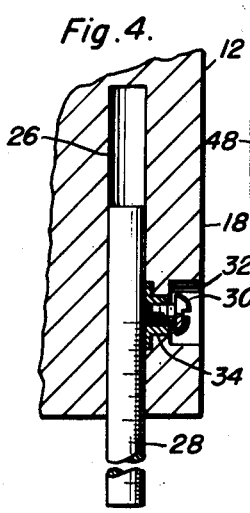
Millard F. Buttram
INVENTOR.

Patented May 12, 1953

2,637,910

UNITED STATES PATENT OFFICE 2,637,910

DOOR HANGING GAUGE

Millard F. Buttram, Oneida, Tenn.

Application January 25, 1949, Serial No. 72,618

1 Claim. (Cl. 33—197)

This invention relates to new and useful improvements and structural refinements in door hanging gauges, and the principal object of the invention is to facilitate accurate and expeditious marking of hinge and lock locations on doors and door jambs, so that the door hanging operation may be effected with speed, convenience and with the expenditure of minimum amount of labor.

One of the features of the invention resides in the provision of means on the gauge for accurately marking the location of hinges and locks, these means being adjustable so as to suit locks and hinges of various sizes and types.

A further feature of the invention resides in the provision of a gauge which may be effectively employed with doors of various sizes, and another feature of the gauge resides in its discerptibility, so to speak, which permits the gauge to be separated into a plurality of components which may be easily transported or stored when the gauge is not in use.

Some of the advantages of the invention lie in its simplicity of construction, in its accuracy, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention;

Figure 2 is a fragmentary cross sectional view, taken substantially on the plane of the line 2—2 of Figure 1;

Figure 3 is a fragmentary cross sectional view, taken substantially on the plane of the line 3—3 in Figure 1;

Figure 4 is a fragmentary cross sectional view, taken substantially on the plane of the line 4—4 in Figure 1;

Figure 5 is a cross sectional view, taken substantially on the plane of the line 5—5 in Figure 1;

Figure 6 is a cross sectional view, taken substantially on the plane of the line 6—6 in Figure 1; and, Figure 7 is a fragmentary perspective view showing the lock marking template attached to the gauge beam.

Like characters of reference are employed to designate like parts in the specification and throughout the several views.

Referring now to the accompanying drawings in detail, the invention consists of a door hanging gauge designated generally by the reference character 10, the same embodying in its construction a straight edged beam 12 which preferably consists of a plurality of longitudinally aligned sections 14, 16, 18, etc., these sections being separably connected together by being provided at the adjacent end portions thereof with coacting mortises and tenons as exemplified at 20, 22 respectively in Figure 3. Spring pressed balls 24 are employed for releasably retaining the tenons in their respective mortises, so that the entire beam may be expeditiously disassembled into its sections so as to facilitate convenient portability or storage when the gauge is not in use.

The section 18 of the beam 12 is provided in the end portion thereof with a bore 26 to slidably receive a graduated extension bar 28, whereby the overall length of the beam may be increased or decreased, so to speak, in accordance with the "height" of the door and door jamb which is to be marked. The extension 28 may be releasably locked in the bore 26 by means of a set screw 30, this being disposed in a recess 32 provided in the beam section 18, and operatively engaging a screw threaded insert 34, as shown in Figure 4.

The beam section 14 is equipped with a plurality of suitably arranged spirit levels 36, 38 and 40 to facilitate true vertical setting of the gauge, and it is to be noted that the upper end of the beam section 14 is also equipped with a spacer 42 which is secured in position by a suitable screw 44, this spacer being employed for determining proper clearance between the upper edge of the door and the door jamb, as will be clearly apparent.

To facilitate marking of the hinges on the door and door jamb, the beam section 14 is equipped with a longitudinally extending opening 46, the longitudinal edges of which are formed with opposing grooves 48 to slidably receive a hinge marking guide 50, the cross sectional configuration of which is best shown in Figure 5.

A suitable block 50' is secured to the front surface of the guide 50 by a screw 51 to bring the guide flush with the face of the beam section 14, and the beam section may be provided in one side thereof with a slot 51' communicating with the opening 46, so that when desired, the guide 50 may be removed through the slot 51' after the block 50' is detached from the guide.

It is to be noted that the grooves 48 are sufficiently wide so as to accommodate, in addition to the guides 50, a pair of pressure strips 52, and a set of screws 54 are provided in the beam section 14, these screws being used for urging the strips 52 against the guide 50, so that the latter may be locked, so to speak, in a predetermined position in the groove 48, as necessitated by the dimensions of the door hinge which is to be marked.

A pair of hinge marking guides 56, 58 are slidable in longitudinally extending grooves formed in an elongated opening 60 in the beam section 18, the arrangement of these guides 56, 58 being similar to that of the guide 50, and suitable screws 62 being employed for urging pressure strips in engagement with the guides 56, 58, in the same manner as the screws 54 are used for locking the guide 50.

Means are provided for marking the position of the lock on the door, these means involving the formation of an elongated opening 64 in the beam section 16, together with a carriage 66 which is movable transversely in the opening 64. This is effected by mounting the carriage 66 slidably on a pair of spaced parallel guide rods 68 and providing the beam section 16 with an externally rotatable screw 70 which extends through the carriage 66 in such manner that rotation of the screw causes the carriage to travel transversely in the opening, as will be clearly apparent. The carriage 66 is formed with a plurality of bores 72 arranged in a vertical row, these bores being adapted to slidably receive thereon a plurality of pointed marking pins 74 which may be driven into the door so as to mark the location of the door lock, as will be clearly understood. The pins 74 are used, of course, for marking the edge of the door, while the location of the door lock on the face of the door may be determined by means of a lock marking template 76 which is adjustably secured as at 78 to either edge portion of the beam section 12, as is best shown in Figure 7.

In instances where a center hinge is used on a door, the beam section 16 may be equipped with an opening 80 to accommodate a further pair of hinge marking guides 82, 84 which are slidable in the opening 80 and may be locked in a predetermined position by a plurality of screws 86, this arrangement being similar to that of the aforementioned hinge marking guides 56, 58.

A pair of suitable blocks 88, 90 may be provided at the outer ends of the respective beam sections 14, 18, so that the gauge may be effectively employed in association with doors and door jambs which are bowed, the blocks 88, 90 providing sufficient clearance so that the outwardly bowed portion of the door or door jamb may properly engage the beam section 16, as will be clearly apparent.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a door hanging gauge, a beam provided intermediate its ends with a longitudinally extending opening, a carriage slidable transversely in said opening and formed with a plurality of parallel bores, a plurality of pointed marking pins slidable in the respective bores, and a flat lock marking templet secured to said beam adjacent said opening and projecting laterally therefrom, said plate being disposed in a plane parallel to said pins.

MILLARD F. BUTTRAM.

References Cited in the file of this patent

UNITED STATES PATENTS

| Number | Name | Date |
|---|---|---|
| 1,004,471 | Rose | Sept. 26, 1911 |
| 1,050,155 | Mason | Jan. 14, 1913 |
| 1,487,579 | Kurczewski | Mar. 18, 1924 |
| 1,634,667 | Hobbisiefken | July 5, 1927 |
| 1,671,858 | Forsberg et al. | May 29, 1928 |
| 1,679,074 | Carter | July 31, 1928 |
| 1,849,961 | Snelling | Mar. 15, 1932 |
| 2,239,576 | Seiger | Apr. 22, 1941 |